United States Patent
Scoca et al.

(10) Patent No.: US 7,525,875 B2
(45) Date of Patent: Apr. 28, 2009

(54) METHOD FOR ALL OCEAN-TERRAIN SHIPS COVERT VELOCITY REFERENCE

(75) Inventors: Anthony L. Scoca, Hicksville, NY (US); James G. Huber, North Babylon, NY (US); Jerry Gabriel Klein, Bellerose, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 260 days.

(21) Appl. No.: 11/742,561

(22) Filed: Apr. 30, 2007

(65) Prior Publication Data

US 2008/0144440 A1    Jun. 19, 2008

Related U.S. Application Data

(60) Provisional application No. 60/796,644, filed on Apr. 28, 2006.

(51) Int. Cl.
*G01S 15/60* (2006.01)
(52) U.S. Cl. .......................................... 367/89; 367/95
(58) Field of Classification Search .................. 367/89, 367/91, 95
See application file for complete search history.

(56) References Cited

U.S. PATENT DOCUMENTS

2007/0025184 A1*  2/2007  Scoca et al. .................... 367/89
2008/0144440 A1*  6/2008  Scoca et al. .................... 367/89
2008/0273423 A1* 11/2008  Scoca et al. .................... 367/89

* cited by examiner

*Primary Examiner*—Dan Pihulic
(74) *Attorney, Agent, or Firm*—DeMont & Breyer LLC

(57) ABSTRACT

Methods for mitigating errors in velocity estimates obtained from correlation SONARs when the SONARs are operated over irregular ocean-bottom terrain are disclosed.

10 Claims, 12 Drawing Sheets

METHOD FOR ALL OCEAN-TERRAIN SHIPS COVERT VELOCITY REFERENCE

CROSS REFERENCE TO RELATED APPLICATIONS

This applications claims priority of U.S. Provisional Patent Application 60/796,644 filed 28 Apr. 2006, which is also incorporated by reference herein. Any contradictions or inconsistencies in language between this application and 60/796,644 that might affect the interpretation of the claims in this application should be interpreted to be consistent with the language in this application.

FIELD OF THE INVENTION

The present invention relates to SONAR in general, and, more particularly, to correlation SONAR.

BACKGROUND OF THE INVENTION

Accurate velocity estimation for submerged vessels, such as submarines, is very important for some applications. For example, accurate velocity estimation improves the accuracy of certain on-board missile-delivery systems.

Correlation SONAR is capable of providing the most accurate measure of absolute velocity for a submerged vessel. A correlation SONAR system typically includes a SONAR source (projector), a receiver array (of hydrophones), and signal processing hardware and software. The position of each receiver within the array is fixed and known to a high degree of accuracy. The projector(s) directs a series of acoustic pulses towards the ocean floor and the receivers detect echoes of those pulses.

As discussed further below, correlation SONARS rely on selecting a best or maximum "correlation" either between hydrophones or pulses, for the determination of velocity. Maximum correlation occurs when the ray path of an initial SONAR transmission (from the transmitter to the ocean floor, etc., and back to a receiver) of a first detected pulse is equal to the ray path of a second SONAR transmission.

There are two types of correlation SONAR: spatial and temporal. Spatial-correlation SONAR estimates the velocity of a vessel by transmitting two or more pulses towards the ocean bottom, detecting echoes of the pulses on a planar two-dimensional array of hydrophones, determining which two hydrophones in the array correlate the best, and dividing the distance between those hydrophones by twice the time differential between the pulses. The time differential between the detected pulses for which maximum correlation occurs is referred to as the "optimal-correlation time", $CT_o$. In some cases, no two hydrophones will have a spacing that results in a maximum correlation. For example, peak correlation may occur between two hydrophone locations. In this case, an interpolation scheme is used as a part of the velocity estimation. Interpolation, however, reduces the accuracy of the velocity estimate.

Temporal-correlation SONAR also estimates the velocity of a vessel by transmitting two or more pulses toward the ocean bottom and detecting echoes of the pulses at a hydrophone array. For a given pair of hydrophones, the temporal system determines which two pulses correlate the best, and calculates velocity by dividing the fixed distance between the hydrophones by twice the time differential between the two correlated pulses.

Correlation SONARs provides an estimate of velocity for discrete times corresponding to when the pulses were sent and received. To provide a continuous estimate of velocity, an inertial system (e.g., gyroscopes, etc.) is typically used. But a velocity estimate obtained from an inertial system is known to be far less accurate than those obtained by correlation SONAR (due to gyroscope drift, etc.) on a long term basis. A Correlation SONAR yields relatively noisy pulse pair velocity estimates but has little bias error. In contrast, an inertial system is very accurate in a high frequency sense but is characterized by long term errors.

To provide a continuous estimate of velocity that is more accurate than can be obtained via an inertial system, the velocity estimate from a correlation SONAR system is used to "correct" the velocity estimate obtained via the inertial system. More particularly, a velocity estimate from the inertial system and a velocity estimate from the correlation SONAR system are obtained at the same time. The difference between those two estimates is calculated and filtered over time and the result is used to correct the continuous estimates of velocity from the inertial system. This filtering process reduces the high frequency noise error in the SONAR velocity estimates while retaining the benefit of the low bias error SONAR data. The correction factor is recalculated on a frequent basis to provide a current correction to inertial-system-based velocity estimates.

For applications in which an absolute (i.e., ground-referenced) velocity estimate is required, such as for a missile launch system, the acoustic pulses from the SONAR system projector must be directed toward a stationary feature. In the ocean, that feature is the ocean bottom. Unfortunately, correlation SONAR, like other types of SONAR, is subject to performance degradation when it is operated over irregular or otherwise problematic ocean-bottom terrain. The problem arises because such terrain affects the bottom return in a variety of ways that are problematic for existing SONAR processing techniques. Examples of problematic terrain includes highly sloped regions, regions that are particularly rough or reflective, seamounts, fracture zones, ridges, the continental shelf, and escarpments.

It would be useful to identify the error mechanisms that cause the performance degradation of correlation SONAR systems. Once identified, it would be beneficial to develop improved correlation SONAR processing methods to mitigate, to the extent possible, the performance degradation that otherwise results.

SUMMARY OF THE INVENTION

The present invention provides methods to mitigate or eliminate the performance degradation of spatial or temporal correlation SONARs that results when operating the SONAR system over problematic ocean-bottom terrain.

Before improved correlation SONAR processing methods that address this problem can be developed, the nature of the SONAR processing errors that arise from such terrain must be identified. And to the extent that these error mechanisms have not been understood in the prior art, the identification thereof is another aspect of the present invention.

It has been discovered that irregular ocean-bottom terrain results in bottom returns that, by virtue of the nature of the return signal, result in the following error mechanisms:

Loss of ocean bottom tracking (over a highly-sloped ocean bottom);

Transmit time modeling error due to pulse-to-pulse scatter (over a highly-sloped ocean bottom);

Transmit time offset modeling errors due to inaccurate pulse location (over a highly-sloped ocean bottom);

Insufficient signal-to-noise ratio in the bottom return (over a highly-sloped or rough ocean bottom);

Amplitude and phase mismatches in the bottom return (over a highly-sloped or rough ocean bottom);

Split specular bottom returns (over ocean-bottom terrain having multiple reflective features); and Extremely reflective bottom returns (over ocean-bottom terrain that is highly reflective).

In accordance with the illustrative embodiment of the present invention, the error mechanisms listed above are addressed by one or both of the following methods. One approach is to employ methodologies that address the effects of scatter in the bottom returns. The other approach is to reduce inter-pulse scatter, such as by increasing pulse spacing. In all embodiments, these methodologies are readily integrated with standard correlation SONAR (both spatial and temporal) processing. And those skilled in the art, after reading the present disclosure, will know how to do so.

DETAILED DESCRIPTION

To provide context for the illustrative embodiment, this Detailed Description begins with a discussion of how to estimate ships velocity using correlation SONAR; in particular, a spatial correlation SONAR. After that, the various SONAR processing errors, the manner in which they arise, and methods for their mitigation are disclosed. These methods are "add-ons" or modifications to known correlation SONAR processing methodologies and are readily incorporated therewith.

Velocity Estimation via Spatial Correlation SONAR

Figure 1:
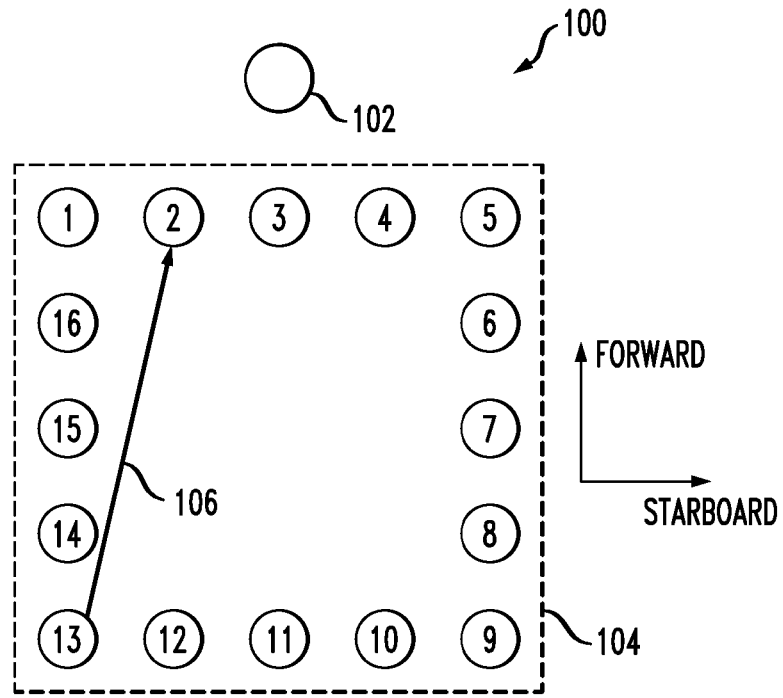
FIG. 1 depicts a schematic diagram of a prior-art velocity-measuring correlation SONAR system.
Figure 3:
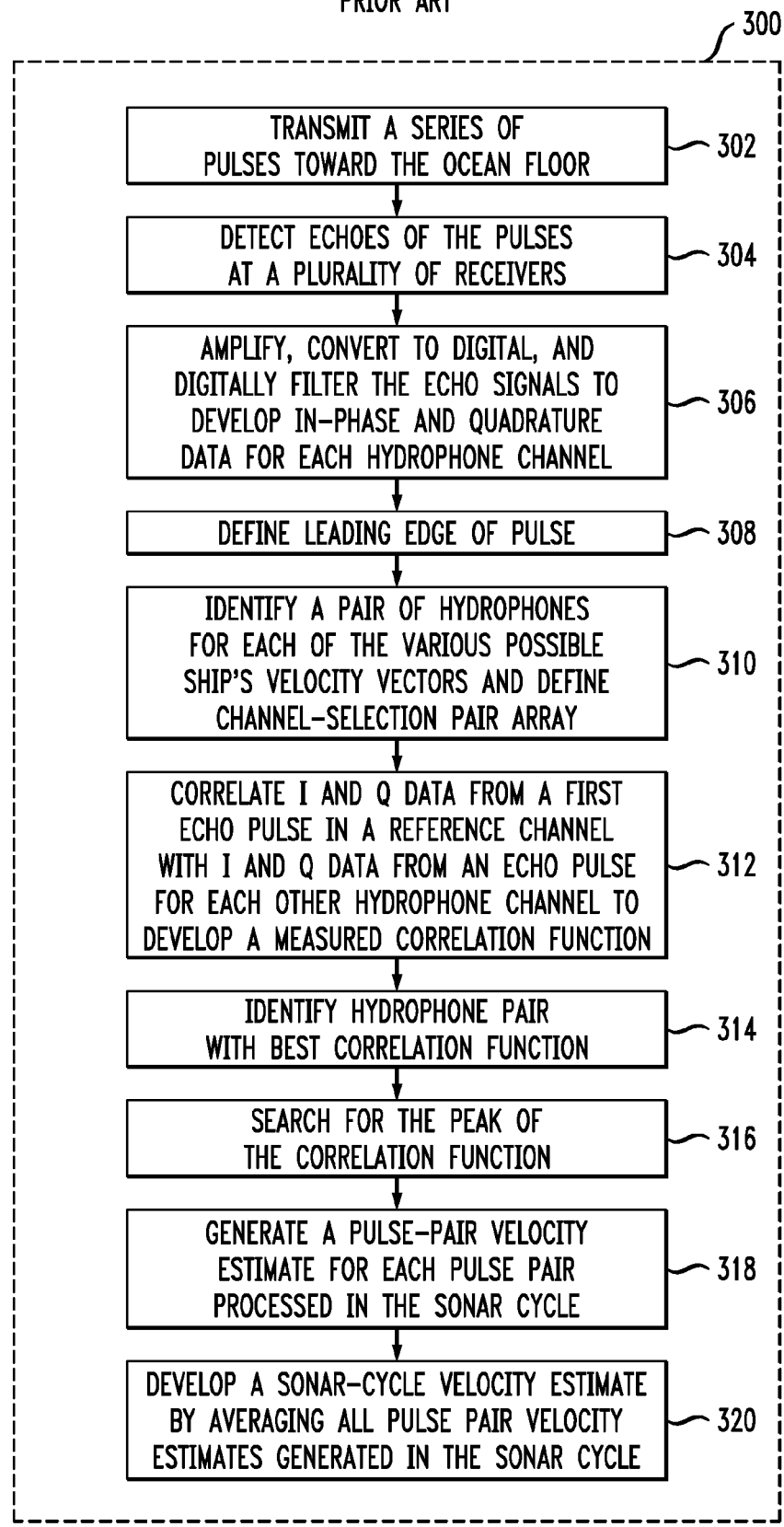
FIG. 3 depicts prior-art method 300 for a velocity-estimating, spatial-correlation SONAR.

FIG. 1 depicts a schematic of a prior-art velocity-measuring correlation SONAR system. SONAR system 100, which may be mounted on the underside of a ship, comprises transmitter 102 and receiver array 104. Receiver array 104 comprises receivers or hydrophones 1 through 16 (the terms "receiver" and "hydrophone" are used interchangeably herein). For the purposes of illustration, it is assumed that receiver pair 106, which comprises receivers 13 and 2, is the "best-correlated receiver pair" in receiver array 104, as will be described further below and with respect to FIG. 3.

The particular arrangement depicted as array 104 is the Trident SSBN Navigation Sonar System sixteen-hydrophone box array, and is mounted to the underside of a ship that is traveling in a generally-forward direction as defined by FIG. 1.

Figure 2:
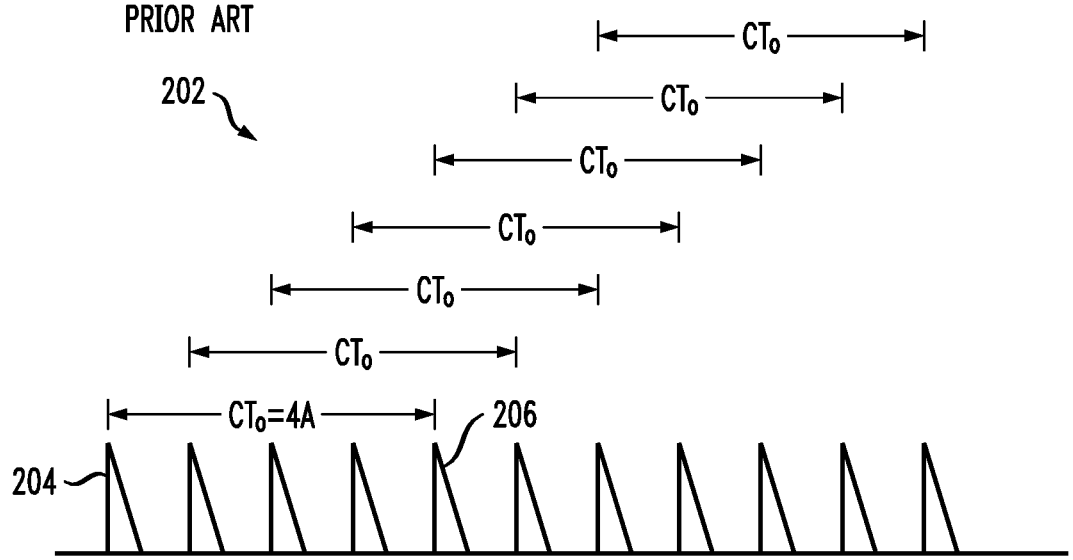
FIG. 2 depicts correlated pulses detected by a best-correlated receiver pair of a receiver array and processed by a high-speed processor, according to the prior art.

FIG. 2 depicts correlated pulses detected by a best-correlated receiver pair of a receiver array, according to the prior art.

As shown in FIG. 2, detected pulse train 202 comprises echoes detected by best-correlated receiver pair 106 of receiver array 104. (See, e.g., FIG. 4 for a depiction of an actual "detected pulse train" or "bottom return.") In this example, detected pulse train 202 has equal pulse spacing, A, as transmitted by transmitter 102. Detected echo pulses 204 and 206 exhibit the best pulse-pair correlation between detected pulses at all receiver pairs in receiver array 104, as will be described below and with respect to FIG. 3. The time between pulses 204 and 206 defines the optimal-correlation time, 4A.

A SONAR pulse-pair velocity estimate is then made based on the separation between the receivers exhibiting the best correlation and the optimal correlation time. For this example, it is assumed that sufficient processing speed is available to process all pulse-pairs characterized by the optimal correlation time, $CT_o$. Further details of how to estimate velocity using spatial-correlation SONAR are provided below in conjunction with FIG. 3, which depicts prior-art method 300 for velocity estimation using spatial-correlation SONAR.

In accordance with operation 302 of prior-art method 300, a series of pulses are transmitted vertically towards the ocean bottom. In operation 304, echoes are detected at each hydrophone 1 through 16 of hydrophone array 104. In some cases, not all of hydrophones 1 through 16 are normally active. Instead, some hydrophones are reserved as backups.

At operation 306, pulse echo data is amplified, converted to digital, and then digitally filtered to yield in-phase ("I") and quadrature ("Q") data for each hydrophone channel. This I and Q data contains all of the amplitude and phase information contained in the echo pulses, but is base-banded and thus vastly reduced in data rate from the A/D converted echo signals.

In accordance with operation 308, a pulse location algorithm is employed to define the leading edge of each pulse.

At operation 310, a pair of hydrophones is identified for each of the various possible ships' velocity vectors, given the arrangement of receiver array 104. A channel-selection pair array, which includes all of the possible non-redundant ship's velocity vectors, is created.

At operation 312, I and Q data from a first echo pulse in a reference channel is correlated with I and Q data from a second (later) echo pulse for each of the other channels. These calculations will form a measured correlation function.

At operation 314, a receiver pair is identified as having the best correlation. In this example, receiver pair 13, 2 is identified as having the best correlation (i.e., receiver pair 13, 2, is "the best-correlated receiver pair"), based on the correlation of I and Q data from echo pulse 204 and echo pulse 206. The time between the detection of detected echo pulses 204 and 206 is the "optimal-correlation time," as defined above. As depicted in FIG. 2, in this example the optimal-correlation time is equal to 4A.

The correlation function is a relationship between the correlation between receiver pairs and their displacement in the x and y directions, where "x" and "y" are fore/aft and athwart ships', respectively. As mentioned above, the correlation peak usually lies between receiver pairs. To locate the correlation peak, an interpolation algorithm is used. The algorithm provides "correlation distances" in the fore/aft and athwart ship's directions. In other words, the algorithm defines different spacing and orientation between the receivers.

Thus, in accordance with operation 316, a search for the peak of the correlation function is performed in a region of the channel-selection pair array. The region is a sub-array (typically a 3×3 array) of receivers that is centered about the best-correlated receiver pair. The search for the peak of the correlation function is performed in this sub-array, since the peak is likely to lie somewhere between the best-correlated receiver pair and another receiver pair in the sub-array.

In accordance with operation 318, a pulse-pair velocity estimate is made based on echo pulses 204 and 206 by dividing the correlation distances (i.e., as obtained from interpolation) by twice the optimal-correlation time, 4A (i.e., twice the time differential between echo pulses 204 and 206). Operation 318 continues with the development of a pulse-pair velocity estimate for each available pulse-pair in the sonar cycle. The number of pulse-pairs that can be processed is determined by available processor speed.

At operation 320, an SONAR-cycle velocity estimate for the given SONAR cycle is developed based on an average of all pulse-pair-based velocity estimates of that SONAR cycle.

A "Good" Bottom Return

Figure 4:
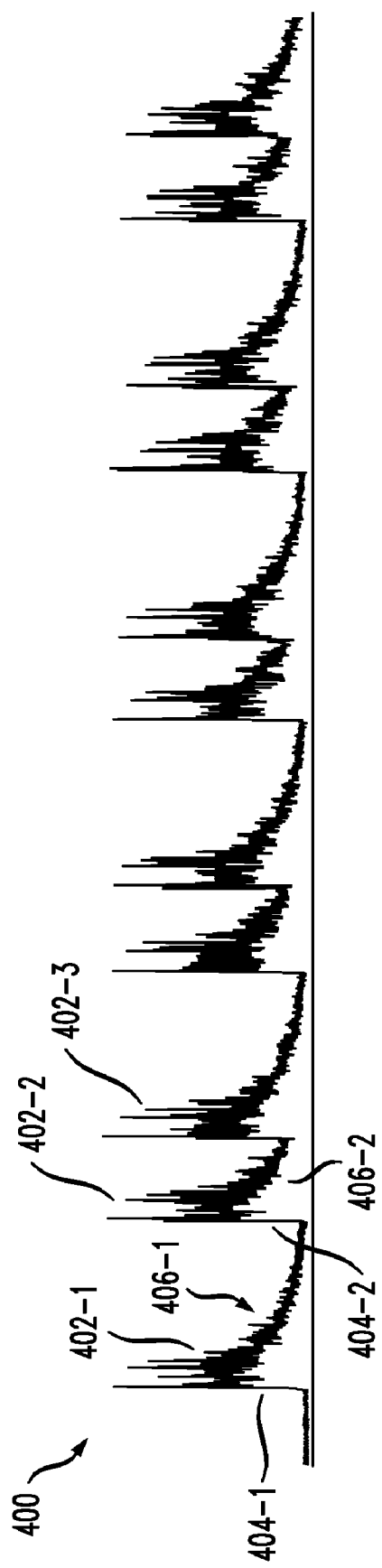
FIG. 4 depicts bottom return 400, which will not present undue processing difficulties for prior-art correlation SONARs.

FIG. 4 depicts bottom return 400. The bottom return that is depicted in FIG. 4 is a considered to be a "good" return in the sense that it will not present undue processing difficulties for a correlation SONAR and is indicative of non-problematic ocean-bottom terrain. Note that pulse echoes 402-1, 402-2, 402-3, etc. (hereinafter collectively "pulse echoes 402-i, i=1, n") are well defined. In particular, leading edge 404-1, 404-2, 404-3, etc., (collectively "404-i, i=1, n") of each pulse is well defined. Therefore, each pulse is readily locatable by the pulse-location algorithm used during SONAR processing (see, method 300, operation 308). As described later in this specification, an inability to determine the location of the pulses in a bottom return is a root cause of a number of SONAR error mechanisms.

Tail region 406-1, 406-2, 406-3, etc., (collectively "406-i, i=1, n") of each pulse contains most of the information in the bottom return that is used for velocity determination. The tail region of the pulses in bottom return 400 have a sufficient signal level (i.e., sufficient signal-to-noise ratio) to extract the relevant information.

Error Mechanisms and Mitigation Thereof

1. Highly Scattered Bottom Return

Figure 5:
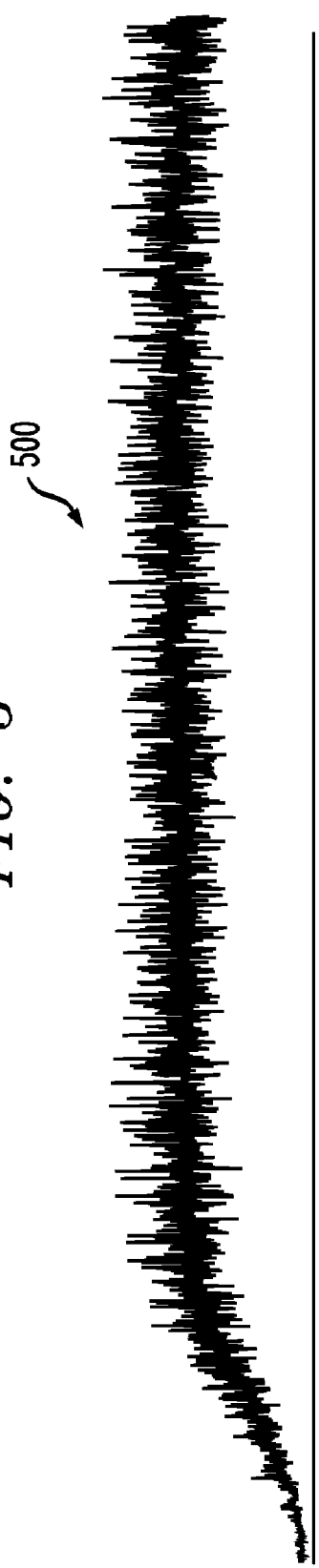
FIG. 5 depicts highly-scattered bottom return 500.

Turning now to FIG. 5, bottom return 500 is depicted. Bottom return 500 is highly-scattered. The pulse echoes, which were clearly defined in bottom return 400, are no longer discernable, at least to the eye. This type of bottom return can result from operating SONAR over a highly-sloped ocean bottom, such as the side of a seamount.

A highly-scattered bottom return, such as bottom return 500, can be the source of several types of error mechanisms, including:
(a) loss of bottom track;
(b) transmit time modeling error due to pulse-to-pulse scatter;
(c) transmit time offset modeling errors due to inaccurate pulse location;
(d) insufficient signal-to-noise ratio; and
(e) amplitude and phase mismatches in echoes (i.e., asymmetric scattering).

These five error mechanisms are discussed below.

1.A Loss of Bottom Track

Prior-art SONAR typically uses a "bi-pulse amplitude" pulse-location algorithm to track depth changes of the ocean bottom from cycle to cycle. The SONAR system establishes a "Receive Window Start ("RWS") time, which is a window of time in which the system "looks" for a bottom return. The RWS is adjusted as a function of ocean depth, since the depth controls how long it will take for the echo to be returned.

Figure 6:
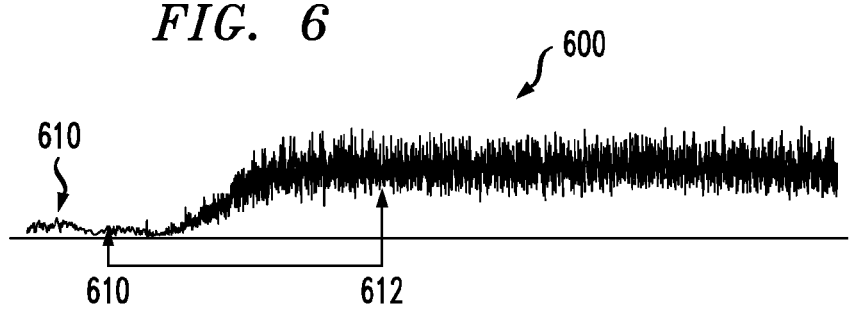
FIG. 6 depicts highly-scattered bottom return 600, and illustrates the incorrect identification of an initial pulse and the use of pseudo pulses for a pulse-pair velocity estimate.

In highly-scattered bottom return like bottom return 500, the bi-pulse amplitude algorithm is likely to fail to locate the pulses since the echoes are not clearly defined. When pulse location fails, prior-art SONAR systems freeze their "Receive Window Start ("RWS") time. When this occurs, and as ocean bottom depth changes, the system is "looking" at the wrong time for a pulse, and might mistakenly characterize noise spike 610 or other artifact as the beginning of the pulse, as depicted in return 600 in FIG. 6.

Furthermore, to partially mitigate this effect, the prior art limits pulse energy used for velocity estimation to that near the centroid of the last known echo return location (i.e., the center 65% of the echo burst) so that as depth changes, but not RWS, the SONAR still uses echo energy for velocity processing. This approach limits the energy available for use and, therefore, gives rise to performance degradation.

Based on correlation time $CT_o$, the system will process "pseudo" pulses 610 and 612, which are not the true pulses. The SONAR will therefore base pulse-pair velocity estimates on such pseudo pulses, which will lead to errors in the velocity solution.

Prior-art SONAR performs a "bottom recovery" to relocate the start of the pulse train after a certain period of bottom track loss. Bottom recovery involves transmitting a short burst of pulses and using a multi-pulse amplitude correlation algorithm for depth detection. This transmit pulse pattern cannot be used concurrently for bottom recovery and ships velocity estimation. Therefore, the SONAR system is effectively taken off-line to perform the bottom recovery. This temporary cessation of velocity estimation degrades SONAR performance. This problem is addressed by the methodology described below.

Figure 7:
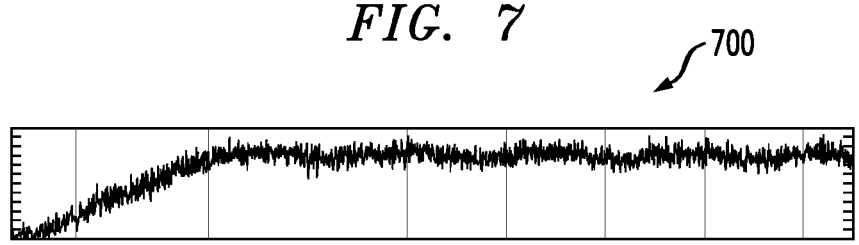
FIG. 7 depicts highly-scattered bottom return 700.

FIG. 7 depicts highly-scattered bottom return 700, which is typical of highly-sloped ocean-bottom terrain. In accordance with the illustrative embodiment of the present invention, return 700 is processed without going off-line to execute a bottom recovery. This is accomplished by:
  (a) transmitting a normal full-duration burst of pulses into the water (versus a short burst for the prior art bottom recovery);
  (b) processing to evaluate the strength of the return echo in segments over the entire receive period;
  (c) performing velocity estimation of echo energy at correlation time $CT_o$; and
  (d) simultaneously adjusting the RWS in accordance with depth changes.

Figure 8:
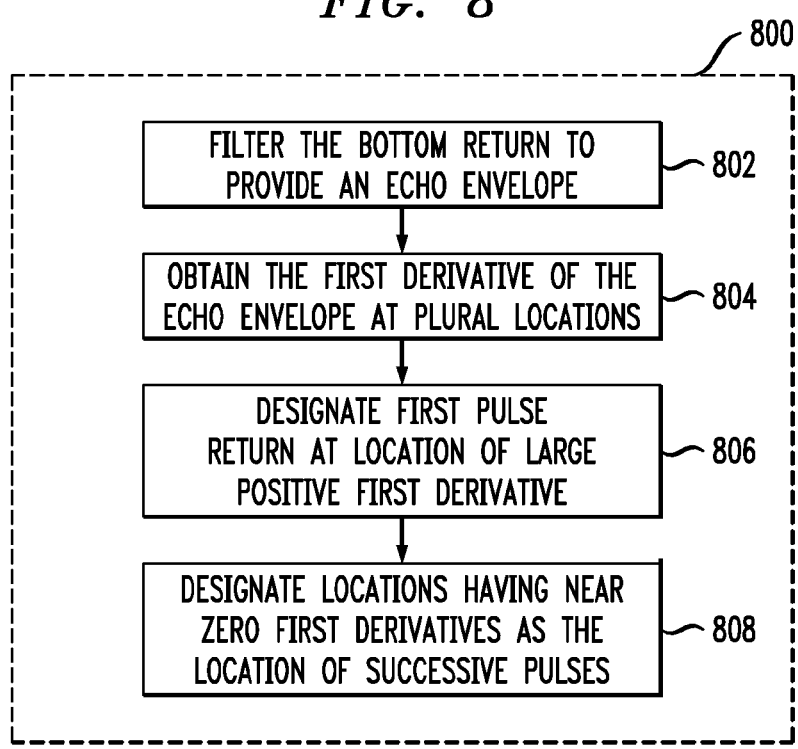
FIG. 8 depicts method 800 in accordance with an embodiment of the present invention.

Operations (a), (c), and (d) are routinely performed as a part of correlation SONAR processing. Operation (b), however, is not routine, and is presented herein as method 800, which is depicted in FIG. 8. It is this operation that enables operations (a), (c), and (d) to be performed even when presented with such a problematic pulse return.

Figure 9:
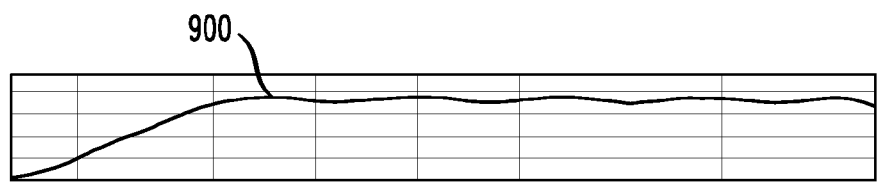
FIG. 9 depicts filtered echo envelope 900 of bottom return 700.

In accordance with operation 802 of method 800, I/Q data from bottom return 700 is processed to provide filtered echo "envelope" 900 that is depicted in FIG. 9. The I/Q data is filtered to obtain the echo envelope via known techniques, such as digital low pass filtering.

Figure 10:
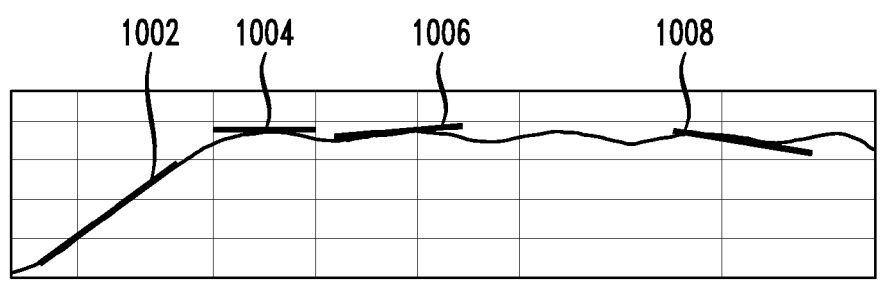
FIG. 10 depicts first derivative of the filtered echo envelope 900.

At operation 804, the first derivative (i.e., the slope) of envelope 900 is obtained at various locations. Derivatives 1002, 1004, 1006, and 1008 are depicted for envelope 900 in FIG. 10. A large positive derivative, such as derivative 1002, is indicative that pulse energy is building and provides a reasonable location for the first pulse return. At operation 806, the portion of the return that coincides with a large positive first derivative is designated as the first pulse of the pulse train.

Near-zero derivatives 1004, 1006, and 1008 indicate an amplitude similarity and the location of successive pulses. At operation 808, portions of the return that coincide with the near-zero first derivatives are designated as successive pulses. A large negative derivative, which is not depicted, is indicative of the large drop in energy, signaling the end of the pulse train. A large negative derivative, which is not depicted, is indicative of the large drop in energy, signaling the end of the pulse train. This approach also eliminates the prior-art disadvantage of restricting the echo energy use to that near the last known echo centroid.

1.B.1 Transmit Time Modeling Error

As previously indicated, correlation SONAR measures the total distance traveled between the times of two transmits and the times at which the corresponding echoes are received. Ships velocity is the total distance traveled divided by twice the time separation of the pulses (i.e., 2× the correlation time).

As previously noted, this pulse-pair velocity estimate is not a continuous ships velocity. To obtain a continuous and accurate measure of ships velocity, a correlation SONAR system uses data from an inertial device along with the SONAR pulse-pair velocity data. More particularly, the SONAR system emulates a pulse-pair measure of ships velocity using inertial data. This is performed by computing total distance traveled between transmit and echo times of the pulse pair using inertial data and subtracting the result from the SONAR velocity estimate. This yields a "pulse-pair correction" to the inertial velocity.

Fortunately, inertial devices and SONAR have complementary error characteristics. Specifically, SONAR yields noisy but unbiased velocity estimates (high-frequency errors) while inertial devices have relatively low incidence of high-frequency errors but is characterized, rather, by low frequency errors such as at Schuler and earth rates.

In standard operations, SONAR filters inertial and SONAR pulse-pair differences and applies the result as a correction to inertial data to yield accurate, continuous ships velocity. But if SONAR is operating over highly-sloped ocean-bottom terrain, performance will be degraded, as described further below.

Figure 11:
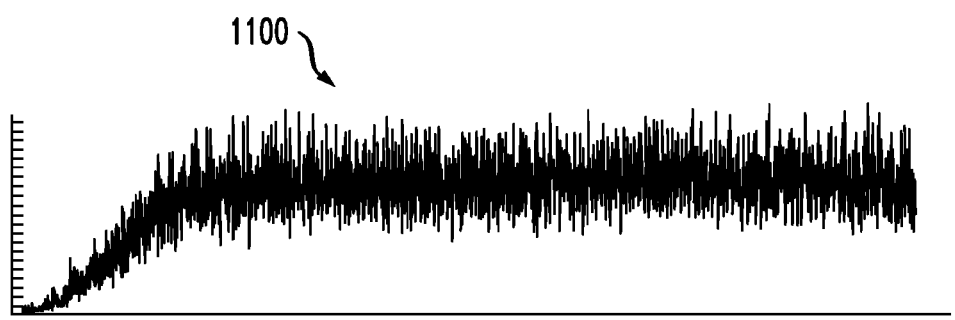
FIG. 11 depicts highly-scattered bottom return 1100.

FIG. 11 depicts bottom return 1100, which like returns 500 and 700, is highly scattered. The pulse echoes in return 1100 are scattered into one another to the extent that processing pulse-pair data using such scattered energy is inconsistent with the correlation SONAR model of "total distance traveled between (only) two transmit pulses."

Figure 12:
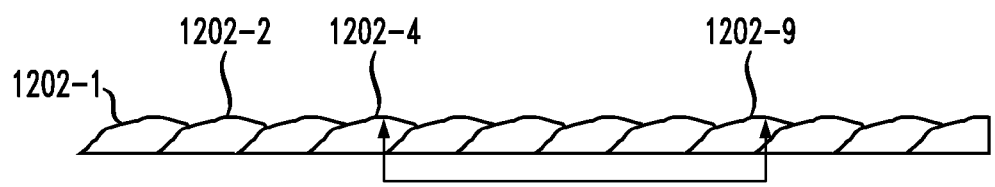
FIG. 12 is a depiction of the individual scattered echoes that collectively define highly-scattered bottom return 1100.

In fact, the echoes that are returned from highly-sloped ocean-bottom terrain actually correspond to a number of transmit pulses, as depicted in FIG. 12. That is, the return envelope is the sum of the individual scattered echoes 1202-1, 1202-2, etc. This is referred to herein as "transmit time" modeling error.

Focusing on, for example, pulses 1202-4 and 1202-9, prior-art SONARs would base the velocity estimate on the Distance Traveled ("DT") by the ship between the transmits that ultimately create pulses 1202-4 and 1202-9 and the distance traveled by the ship between echo pulses 1202-4 and 1202-9. But this approach ignores the overlap of the scattered echoes, as depicted in FIG. 12, and results in performance degradation.

Figure 13:
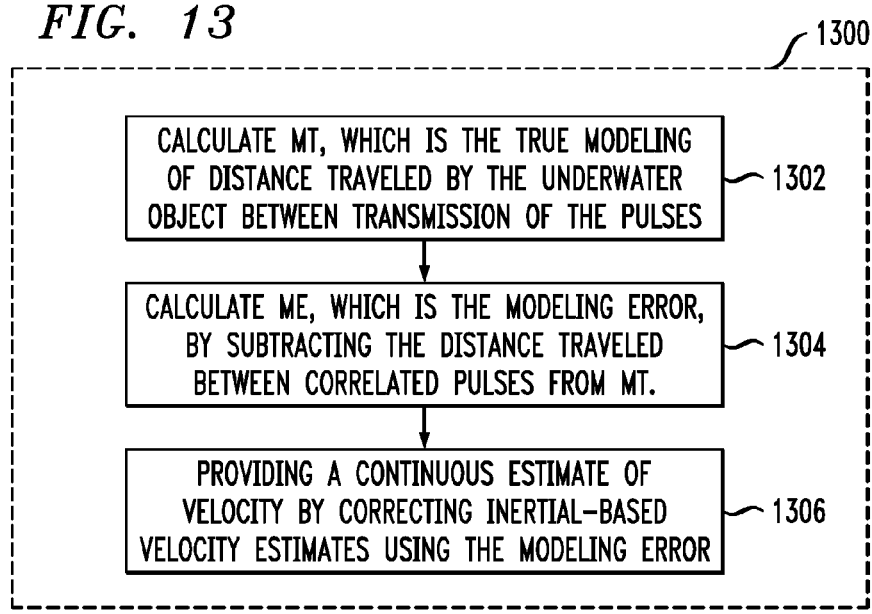
FIG. 13 depicts method 1300 in accordance with an embodiment of the present invention.

Method 1300 (FIG. 13) in accordance with the illustrative embodiment of the present invention provides a way to correct DT for the transmit time modeling error that arises due to the overlap of the scattered echoes.

Prior-art SONARs compute the distance traveled by the ship between just two transmits which, for this example, is PA=DT(t4 to t9). As indicated above, it has been discovered that this prior-art distance calculation is incorrect for operation in a very scattered echo envelop environment. Rather, in accordance with operation 1302 of method 1300, the distance traveled between transmits is calculated via [1], which uses exponential modeling:

$$MT = K_1 e^{-a(t4-t1)} \times DT(t1 \text{ to } t6) + K_2 e^{-a(t4-t2)} \times DT(t2 \text{ to } t7) + K_3 e^{-a(t4-t3)} \times DT(t3 \text{ to } t8) + K_4 DT(t4 \text{ to } t9) \quad [1]$$

Where:
  MT=True modeling of distance traveled between transmit times
  $K_i$ is a normalization constant;
  a is the envelope parameter;
  tn is transmit number n; and
  DT is the distance traveled between the indicated transmits.

And where the normalization constant, $K_i$, is calculated as follows:
  call "SUM" the summation of all of the exponential terms for each contributing transmit pair:

$$SUM = e^{-a(t4-t1)} + e^{-a(t4-t2)} + e^{-a(t4-t3)} + 1.$$

Then: $K1 = e^{-a(t4-t1)}/SUM$;
  $K2 = e^{-a(t4-t2)}/SUM$;
  $K3 = e^{-a(t4-t3)}/SUM$;
  $K4 = 1/SUM$ And where the envelope parameter, a, is calculated as follows:

$a=1/($Depth$\times$Bottom Slope$\times$equivalent two-way transmit & receiver beam pattern$)$ In accordance with operation 1304, the modeling error, ME, is calculated as:

$$ME = MT - PA \qquad [2]$$

In operation 1306, transit time modeling error is applied to inertial velocity calculations to provide a continuous velocity estimate that is more accurate than an uncorrected inertial-based velocity estimate.

The method therefore employs the true modeling between transmit times, MT, for cases in which highly-scattered echoes are received. It is noted that in another embodiment, instead of using exponential modeling as described above, the modeling correction is based on a cosine squared profile for the scattered echo (as per Lambert's law scattering).

1.B.2 Transmit Time Modeling Error—Additional Methods

There are three additional methods for mitigating transmit modeling errors, as follows:

1. Increase pulse spacing to reduce inter-pulse scatter;
2. Vary the frequency of transmit pulses; and
3. Vary the Phase of Transmit Pulses.

Prior-art SONAR transmits a series of closely spaced pulses and processes as many combinations of pulse-pair velocity estimates as possible given processor limitations. This has the advantage of reducing random errors. But over highly-sloped ocean-bottom terrain, the closely spaced pulses are likely to result in transmit time (previously described) and transmit time offset (described below) modeling errors.

In accordance with first alternative method 1400 for mitigating transmit time modeling errors, the transmit pulse spacing is widened for highly-sloped bottom terrain. In other words, the time between transmission of successive pulses is increased. This reduces the incidence of inter-pulse scatter and makes it easier to locate pulses. This method requires that the problematic highly-sloped bottom terrain is first detected. One detection method is simply to observe the failure of the bi-pulse amplitude pulse-location algorithm. Once observed, the transmit pulse spacing is increased. Typically, the pulse spacing is increased proportionately with ocean bottom depth but cannot be increased to such an extent that the time between two adjacent pulses exceeds the correlation time $CT_o$.

Figure 14:
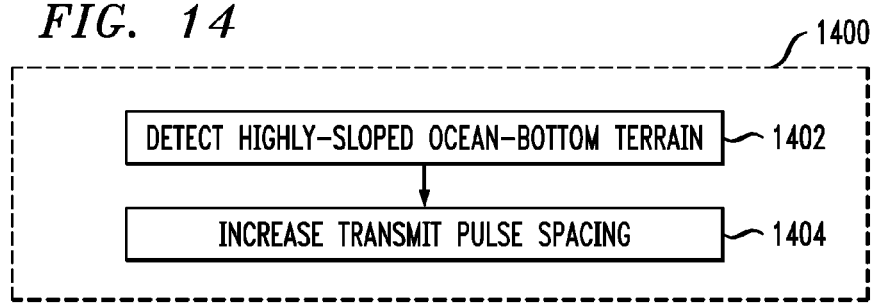
FIG. 14 depicts method 1400 in accordance with an embodiment of the present invention.

In the embodiment depicted in FIG. 14, method 1400 includes the operations of:

1402: Detecting highly-sloped bottom terrain; and
1404: Increasing pulse spacing.

In accordance with second alternative method 1500 for mitigating transmit time modeling errors, the frequency of transmit pulses is varied.

In accordance with method 1500, the normal (dense) pulse pattern is transmitted. For pedagogical purposes, the correlation time for processing the associated echoes is defined as spanning "n" pulses. For the first transmitted pulse, a carrier frequency f1 is used, for the second transmitted pulse, a carrier frequency f2 is used, and so forth until pulse n−1, which uses carrier frequency f(n−1). For transmitted pulse n, the carrier frequency cycles back to f1, and then repeats as before (f2, f3, etc.).

To address the issue of sound attenuation in water, the acceptable range of carrier frequencies must be consistent with the design maximum ocean bottom depth capability of the SONAR as well as the effective pass band of the acoustics sensors. For example, for the deepest ocean-bottom depths (nominally 4500 fathoms), a maximum transmit frequency will be about 15 Khz and the minimum frequency will be about 10 Khz. A bank of band pass filters are used to filter the echoes based on their frequencies.

Figure 15:
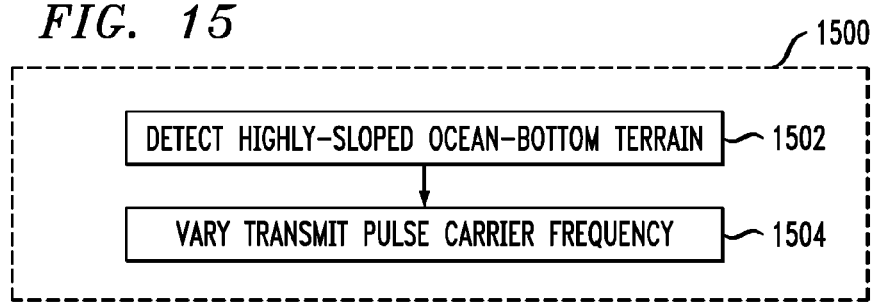
FIG. 15 depicts method 1500 in accordance with an embodiment of the present invention.

In the embodiment depicted in FIG. 15, method 1500 includes the operations of:

1502: Detecting highly-sloped bottom terrain; and
1504: Varying pulse carrier frequency.

It is to be understood that if the presently disclosed method of varying pulse frequency is adopted as the nominal correlation SONAR processing technique, then detection operation 1502 is not required.

Method 1500 enables pulse-pair velocity estimates using pulses 1 and n (at carrier frequency f1) and would enable overlapping processing (e.g., for the second echo and echo n+1 at carrier frequency f2, etc.). In this manner, the same number of pulse pairs can be processed as for prior-art processing. The limitations of this approach pertain to the hardware and processing required for transmit waveform generation, acoustic senor characteristics, filtering and the available acoustic spectrum.

In accordance with third alternative method 1600 for mitigating transmit time modeling errors, the phase of transmit pulses is varied.

In accordance with method 1600, the normal (dense) pulse pattern is transmitted. The correlation time for processing of the associated echoes shall, for explanatory purposes, be defined as spanning "n" pulses. The same carrier frequency is used for all transmit pulses. For transmitted pulse 1 and n, transmission is to be in-phase (i.e., $A \cos(\omega_c t)$). For pulse 2, a slightly out of phase sinusoid is transmitted, and phase is gradually changed for pulses 3 through n−1. The phasing is repeated for pulses n+1, etc. and could consume up to the full 360 degrees.

Figure 16:
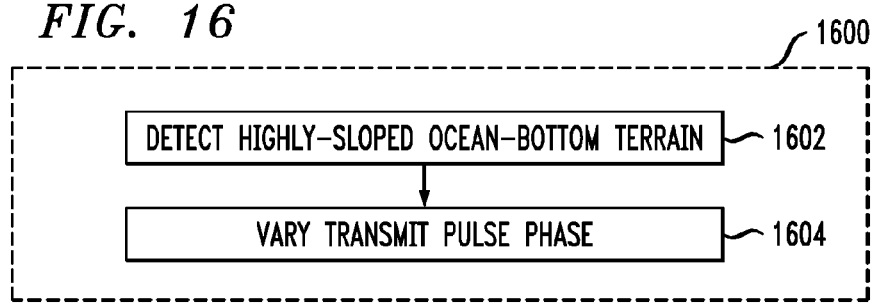
FIG. 16 depicts method 1600 in accordance with an embodiment of the present invention.
Figure 17:
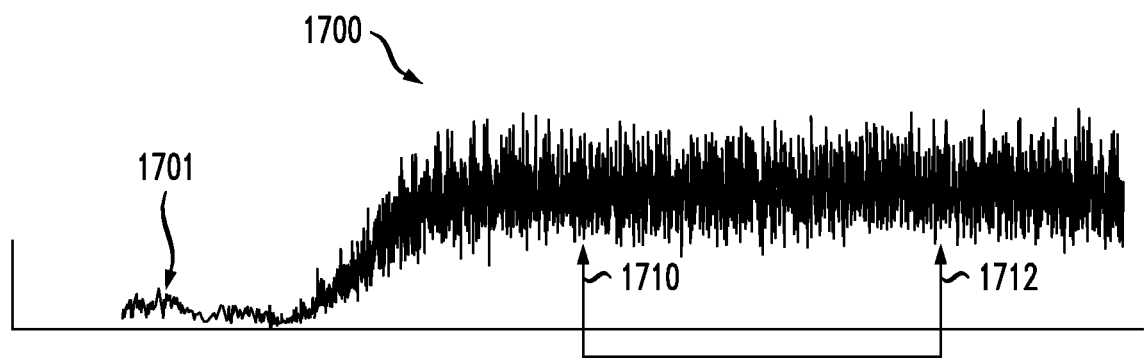
FIG. 17 depicts highly-scattered bottom return 1700, which illustrates a first noise peak being identified as the initial pulse location for the pulse train.

In the embodiment depicted in FIG. 16, method 1600 includes the operations of:

1602: Detecting highly-sloped bottom terrain; and
1604: Varying pulse phase.

It is to be understood that if the correlation SONAR is to be normally operated with a varying pulse phase, as disclosed herein, detection operation 1602 is not required. This method enables processing of all pulse-pairs as in the prior art. Furthermore, this method even permits overlapping pulse-pair processing. Although less hardware intensive than the frequency-variation method disclosed above, this phase-variation method might result in pulse-pair interference effects and introduce lobes into the correlation function.

1.C Transmit Time Offset Modeling Error

As previously indicated, a highly-scattered return, such as bottom return 1700, can result inaccurate pulse location due to loss of bottom track. In such a case, the echo energy that is used for velocity estimation corresponds to transmit pulses that are time offset.

Figure 18:
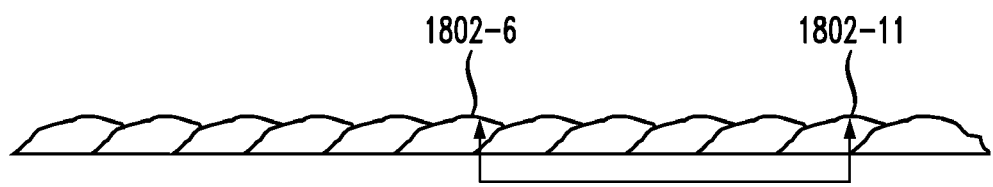
FIG. 18 depicts the location of the received pulses based on return 1700, as determined by prior-art SONAR.
Figure 19:
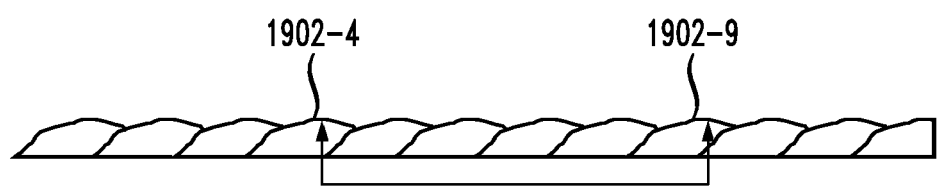
FIG. 19 depicts the location of the received pulses based on return 1700, as they actually are.

Consider the following scenario. Because of the fixed RWS, the pulse-location algorithm incorrectly identifies noise peak 1701 as the first pulse. Based on that, the SONAR identifies the receive pulses as depicted in FIG. 18. The pulse-pair for the velocity estimate is believed to be pulse 1802-6 and 1802-11, but, as depicted in FIG. 19, it is actually pulses 1902-4 and 1902-9. Comparing FIG. 19 to FIG. 18, it can be seen that this error arose because the initial pulse was improperly identified. The SONAR will use the incorrect transmit time for all the pulses, thereby resulting in a velocity error.

This error mechanism is addressed in the same manner as error mechanism "A"—loss of bottom track. In other words, by maintaining bottom track in accordance with the previously described method—and keeping RWS moving with depth—pulse location is more likely to be correct, thereby avoiding transmit time modeling offset error.

1.D Insufficient Signal-to-Noise Ratio

Figure 20:
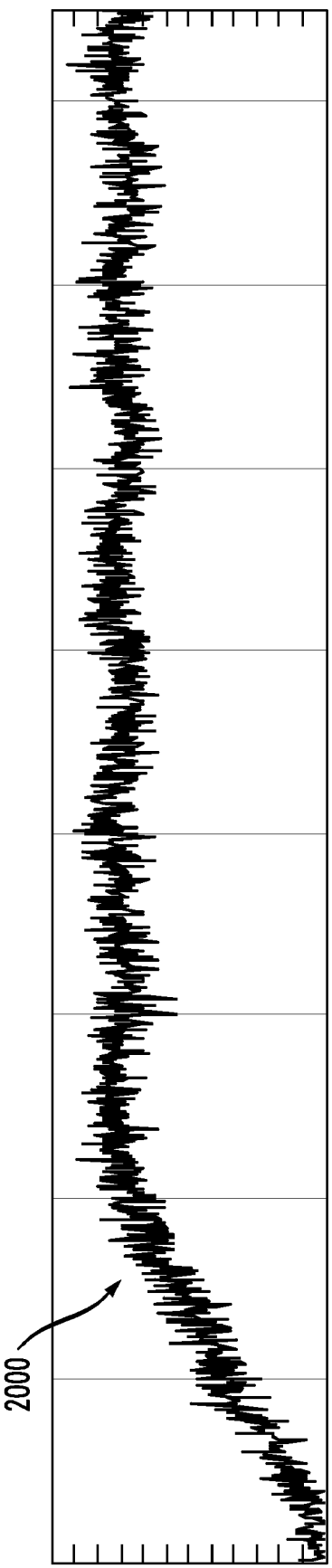
FIG. 20 depicts highly-scattered bottom return 2000.

As noted, highly-sloped ocean-bottom terrain results in scattered returns that do not have clearly identifiable individual pulse echoes. Bottom return 2000 (FIG. 20) is an example of a highly-scattered return. Since the echoes are scattered, prior-art SONAR is not able to provide an accurate measure of noise and, therefore, cannot accurately estimate the signal-to-noise ratio ("SNR").

In an attempt to obtain a desired and consistent SNR, most prior-art SONARs use a feedback control loop to transmit pulses with a certain power level ("PL") and pulse width ("PW"). But when prior-art SONARs are not able to measure SNR (e.g., because of highly-sloped bottom terrain), the PL and PW are held at the previously established level. As a consequence, the SONAR might transmit with insufficient energy, resulting in performance degradation.

Figure 21:
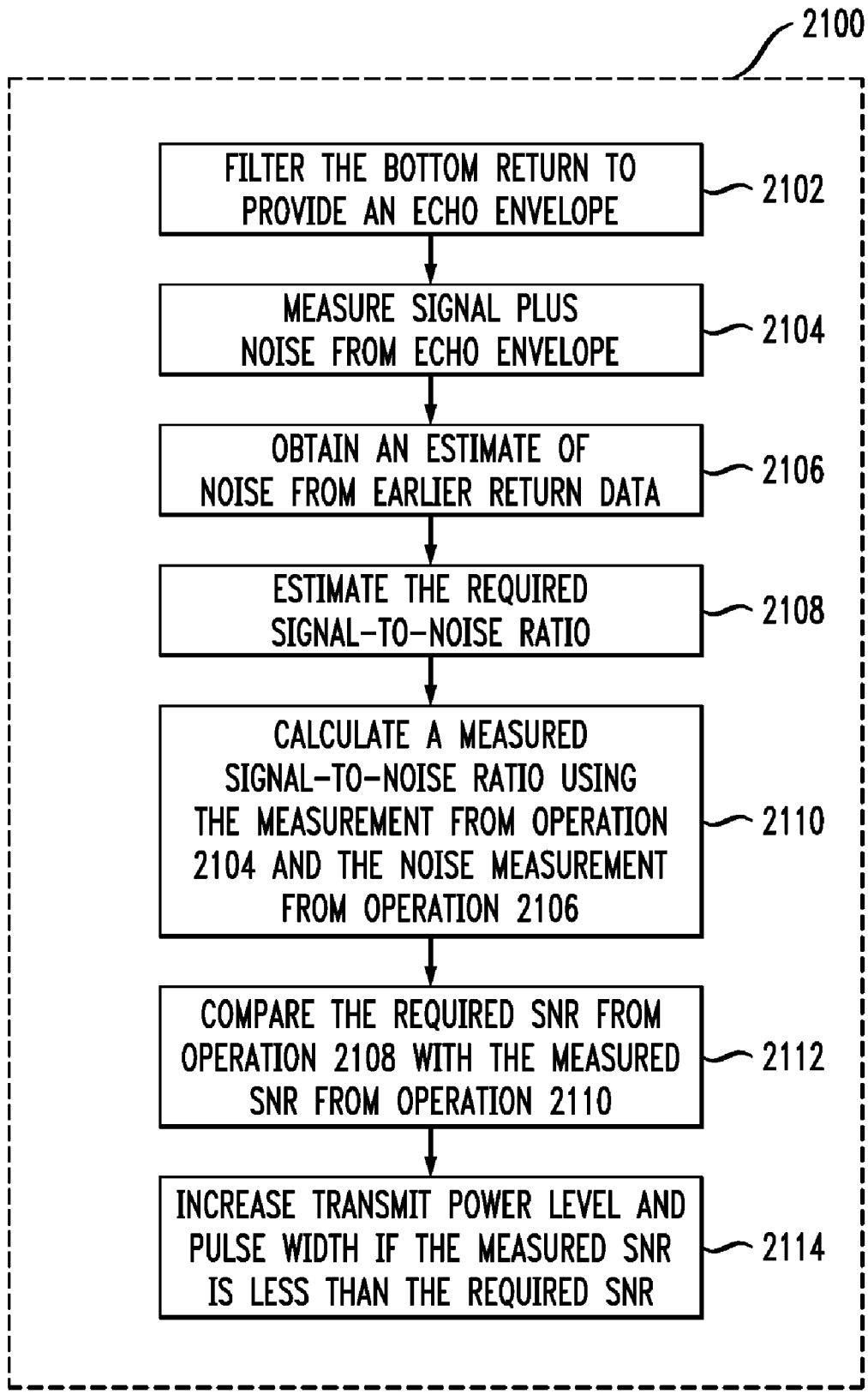
FIG. 21 depicts method 2100 in accordance with an embodiment of the present invention.

In accordance with method 2100 (FIG. 21), the absolute energy of the pulse return is measured and PL and PW is regulated in accordance with SONAR range equation [3], which appears below.

Figure 22:
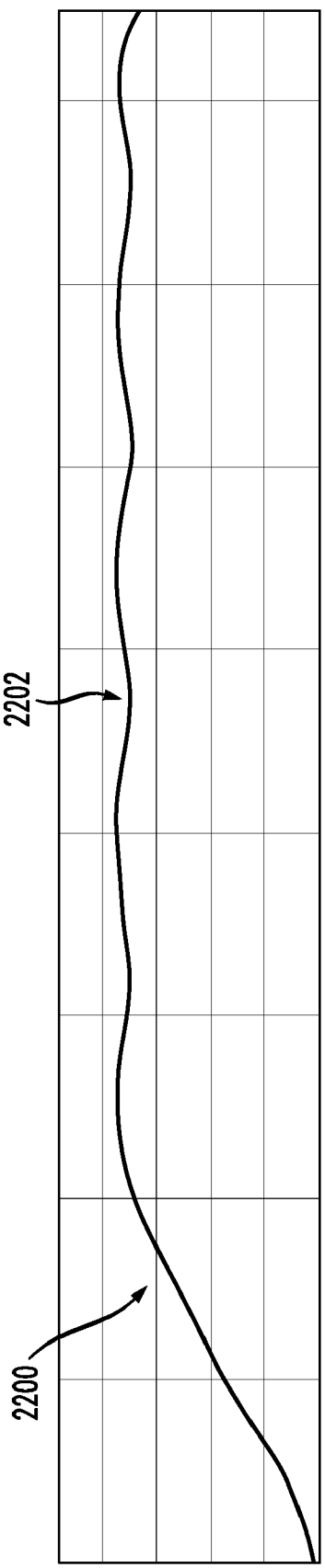
FIG. 22 depicts filtered echo envelope 2200 of bottom return 2000.

As per operation 2102 of method 2100, the bottom return envelope is filtered by standard techniques (e.g., digital bandpass filtering, etc.). FIG. 22 depicts filtered return envelope 2200. In operation 2104, the signal plus noise (S+N) is measured from envelope 2200. As per operation 2106, the noise is then independently estimated from data that is available before the SONAR enters the velocity processing mode.

In accordance with operation 2108, SONAR range equation [3] is used to estimate the required SNR:

$$SNR_{req} = SL - 40 \log D - 2aD - SB - NL \text{ (in dB)} \quad [3]$$

Where: $SNR_{req}$=estimated worst case signal-to-noise ratio using range equation;
SL=acoustic source level computed from PL and PW for transducer/projector;
D=bottom depth below keel;
a=sound attenuation in the ocean for the transmit frequency being used;
SB=ocean bottom backscatter loss; and
NL=noise level.

Per operation 2110, $SNR_{meas}$ is calculated using the S+N measurement from the filtered echo (operation 2104) and from the noise measurement (operation 2106), via [4], below:

$$SNR_{meas} = ((S+N)\text{meas} - \text{Noise})/\text{Noise} \quad [4]$$

In operation 2112, $SNR_{meas}$ is compared to $SNR_{req}$. (Convert $SNR_{meas}$ to dB for operation 2112.) If $SNR_{meas}$ is less than $SNR_{req}$, then SL should be increased by adjusting PL and PW, in accordance with the difference.

1.E Amplitude and Phase Mismatch

Figure 23:
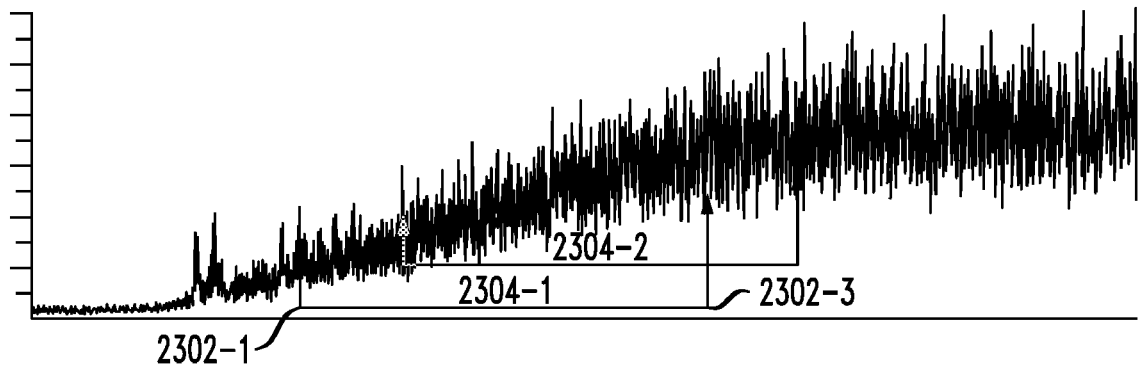
FIG. 23 depicts highly-scattered bottom return 2300.

FIG. 23 depicts highly-scattered bottom return 2300. As previously described, it is very difficult for existing pulse-location algorithms to locate the pulses in a return such as return 2300. As a consequence, "pseudo" pulses are often mistakenly used for the pulse-pair velocity estimates. FIG. 23 depicts pseudo pulse-pairs 2304-1 and 2304-2.

The principle of waveform invariance, upon which correlation SONAR relies, is not satisfied if the two correlated pulses (the two pulses defining the pulse pair) differ in phase and amplitude.

In fact, this scenario, wherein correlated pulses differ in phase and amplitude, can occur over highly-sloped bottom terrain. This is particularly likely to occur if one of the pulses being correlated is taken from the rise or fall sections of the bottom return envelope. For example, compare pseudo pulses 2302-1 and 2302-3 of pulse-pair 2304-1. Clearly, the amplitudes of these two pulses are different.

Figure 24:
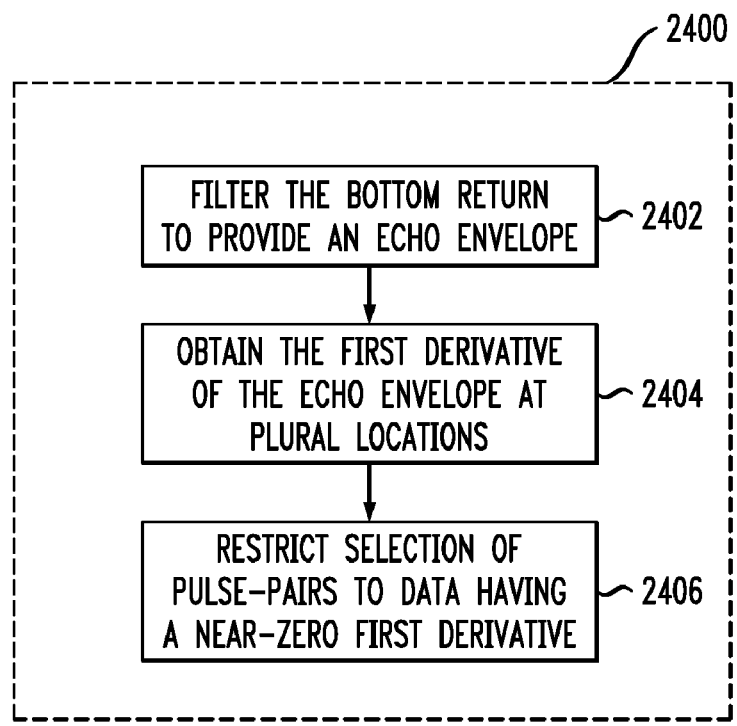
FIG. 24 depicts method 2400 in accordance with an embodiment of the present invention.

In accordance with method 2400 (FIG. 24), the loss of bottom track mitigation method 800 is used in conjunction with limiting pulse-pair velocity estimation to the relatively static amplitude center section of the pulse train. In other words, pulse-pair processing is limited to data that has a near-zero derivative to provide amplitude similarity.

Method 2400 includes the operations of:
2402: Filtering echo envelope;
2404: Obtaining the first derivative of the echo envelope at various locations; and
2406: Restricting selection of pulse-pairs to data that have a near-zero first derivative.

2. Split Specular Bottom Returns

Figure 25:
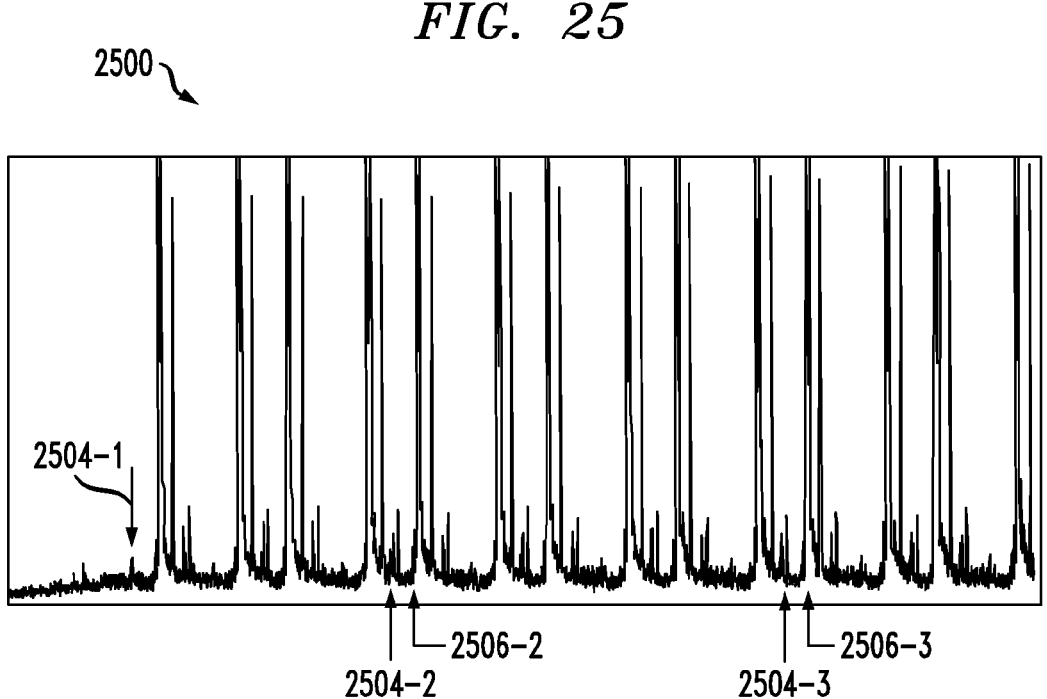
FIG. 25 depicts split specular bottom return 2500.

FIG. 25 depicts bottom return 2500. This bottom return is indicative of an ocean bottom that has multiple reflective (specular) features (e.g., a number of scattered rocks or boulders, etc.). As depicted in FIG. 25, each pulse 2502-i, which would otherwise display an initial spike and a slowly decaying portion as per FIG. 4, is broken up into multiple reflections. This type of return is often referred to as "split specular."

The split-specular return can cause a problem wherein the pulse location algorithm for locating the leading edge of the first pulse identifies an early weak pulse as the initial pulse. Based on this incorrect pulse location, the SONAR will process the weak pulse data having a low signal-to-noise ratio.

In FIG. 25, weak pulse 2504-1 is identified by the prior-art pulse-location algorithm as the initial pulse. As a consequence, pseudo pulses (e.g., pseudo pulses 2504-2 and 2504-3 are correlated as a proper pulse pair. The desired pulses, however, are pulses 2506-2 and 2506-3.

Figure 26:
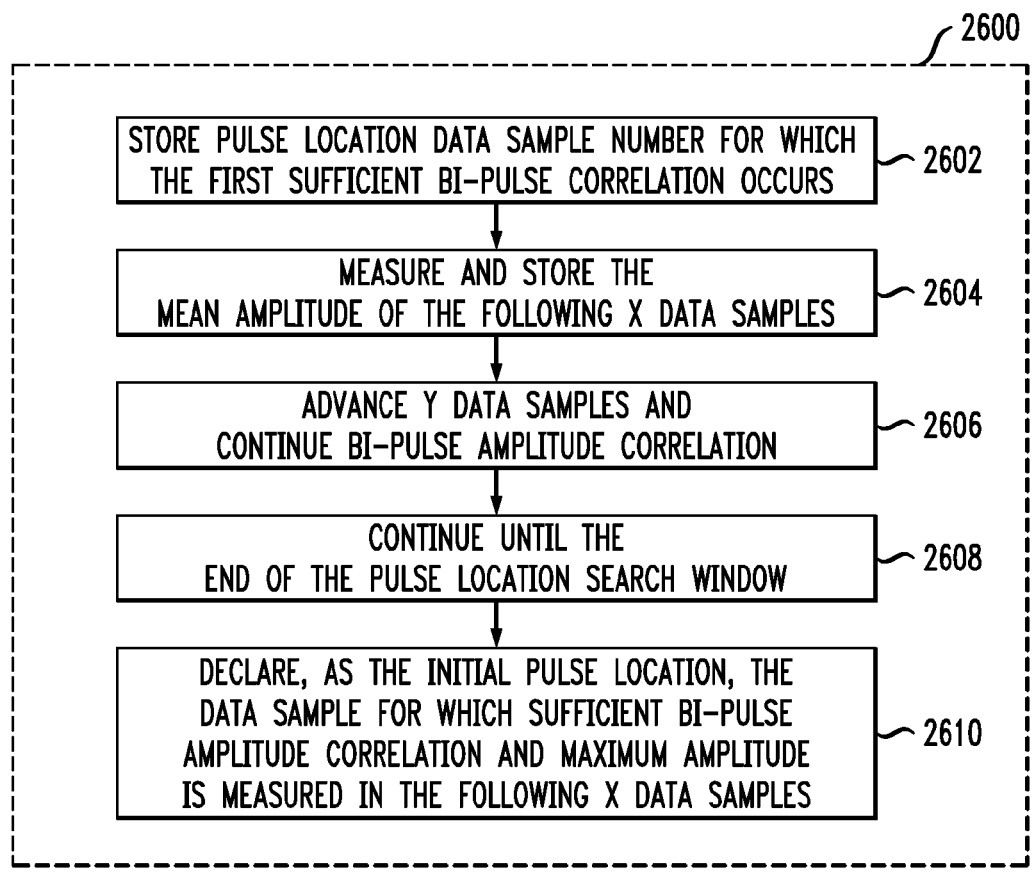
FIG. 26 depicts method 2600 in accordance with an embodiment of the present invention.

In accordance with method 2600 (FIG. 26), a combined amplitude, bi-pulse amplitude correlation algorithm is used to address the problem with split-specular bottom returns.

Method 2600 includes the operations of:
2602: Storing the pulse location data sample number for which the first sufficient bi-pulse correlation occurs;
2604: Measuring and storing the mean amplitude of the following X data samples, where X is proportional to the bottom depth and composite transmit and receiver beam pattern.
2606: Advance Y data samples (Y is typically about $\frac{1}{10}^{th}$ of X) and continue the bi-pulse amplitude correlation until:
(a) another sufficient bi-pulse amplitude correlation occurs, in which case the mean amplitude of the following X data samples are measured, or
(b) a predefined search window ends;
2608: Continue processing until the end of pulse location search window;
2610: Declare, as the initial pulse location, the data sample number for which sufficient bi-pulse amplitude correlation and maximum amplitude is measured in the following X data samples.

3. Extremely Reflective Bottom Returns

Figure 27:
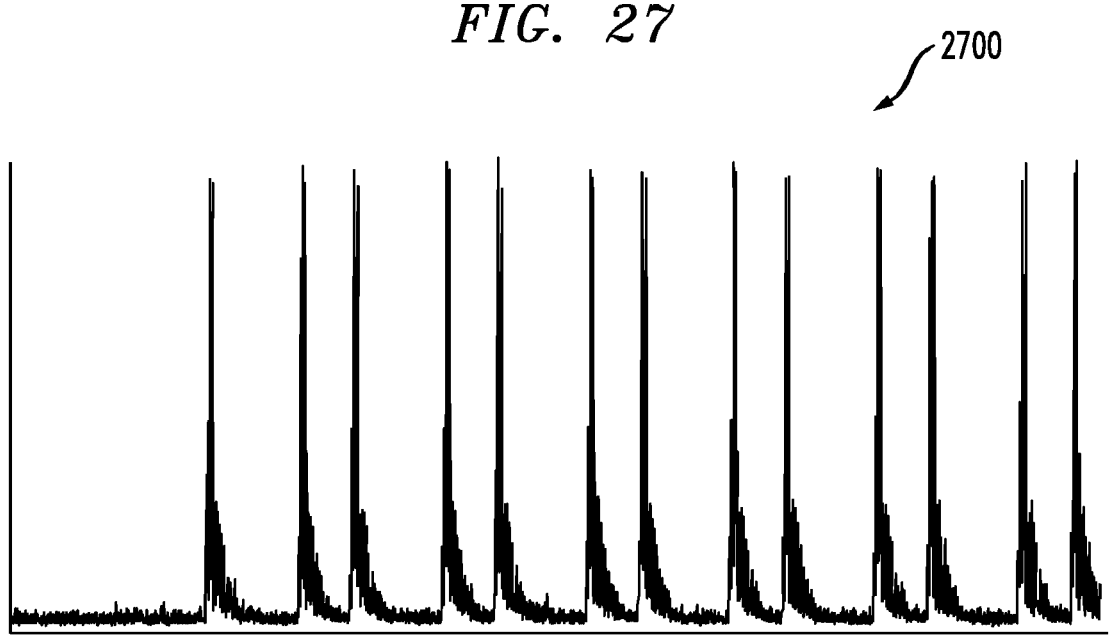
FIG. 27 depicts extremely reflective bottom return 2700.

FIG. 27 depicts bottom return 2700. Certain ocean bottom regions, such as return 2700, result in bottom returns that exhibit an extremely high reflective or specular component compared to the following, and more important, scattered echo component.

Figure 28:
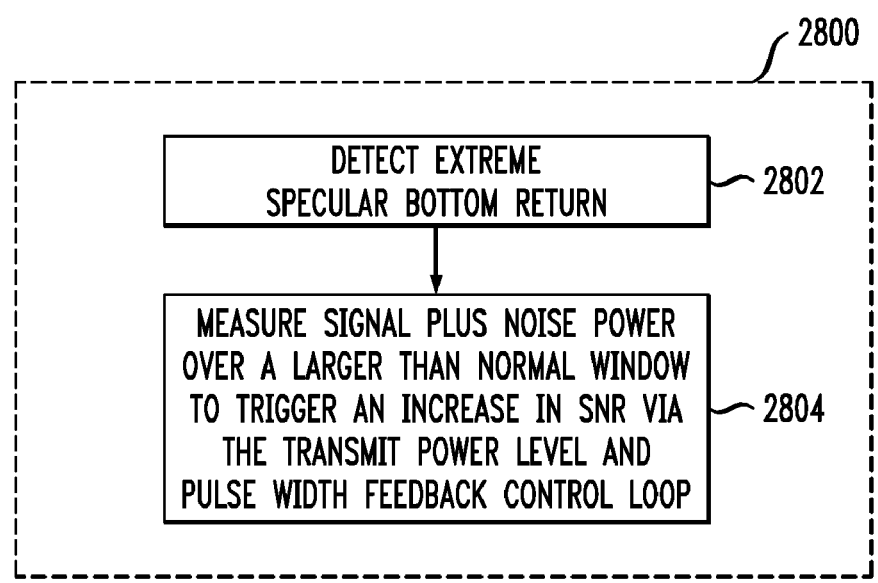
FIG. 28 depicts method 2800 in accordance with an embodiment of the present invention.

With reference to FIG. 28, prior-art SONAR measures signal strength using data in the first portion of the echo (typically from the leading edge of the pulse to a time corresponding to the 3 dB transmit beam width). The velocity estimating portion of the echo typically extends well beyond this beam width point. It can be seen that the low SNR of the important scattered echo portion of the pulse will not be captured by prior-art measurement protocols.

As previously mentioned, the signal-strength measurement is used to compute SNR, which is then used to set the transmit power level (PL) and pulse width (PW) in a feedback control loop. For a very reflective bottom return like bottom return 2700, the SNR control loop reduces transmit PL and PW (based on the high signal-strength measurement) such that the already low level of scattered energy in the echoes which is used for velocity estimation will be further reduced, along with the SNR thereof. This affects performance, since good correlation SONAR performance requires adequate SNR in the scattered part of each pulse.

Method 2800 (FIG. 28) provides a way to mitigate the performance degradation the results from extremely reflective bottom returns.

In accordance with operation 2802 of method 2800, the extreme specular return is detected. Detection is performed via a combination of:
  (a) Successful bi-pulse amplitude correlation pulse location;
  (b) Using echo analysis; evaluate signal-plus-noise power in segments of the echo;
  (c) Observe an unusually low hydrophone-to-adjacent-hydrophone channel echo pulse correlation;
  (d) Observe pulse-pair velocity estimation data attrition (the SONAR may not be able to generate pulse-pair velocity estimates for low SNR in the scattered part of the echoes)

If an extremely specular return is detected via operation 2802, then, in accordance with operation 2804, signal-plus-noise power is measured over a number of pulses for a region greater than the 3 dB transmit beam point width value. This will cause an increase in SNR in the bottom return in accordance with the PL and PW feedback control loop. A corresponding increase in the scattered echo signal will result, thereby providing good SONAR performance.

What is claimed is:

1. A SONAR processing method comprising:
  transmitting pulses toward an ocean bottom from a moving underwater object;
  receiving pulse echoes, wherein the pulse echoes collectively define a bottom return;
  filtering data from the bottom return to generate a filtered echo envelope;
  obtaining a first derivative of the filtered echo envelope at each of a plurality of locations;
  identifying a location of a first pulse echo and subsequent pulse echoes in the bottom return based on analysis of the first derivatives; and
  estimating velocity of the moving underwater object based on the pulse echoes.

2. A SONAR processing method comprising:
  transmitting pulses toward an ocean bottom from a moving underwater object;
  receiving pulse echoes, wherein the pulse echoes collectively define a bottom return;
  identifying a location of the first pulse echo and subsequent pulse echoes;
  calculating MT, which is the true modeling of distance traveled by the underwater object between transmission of the pulses;
  calculating modeling error by subtracting the distance traveled between correlated pulses from MT; and
  providing a continuous estimate of velocity by correcting velocity estimates obtained from an inertial device by the modeling error.

3. A SONAR processing method comprising:
  transmitting pulses toward an ocean bottom from a moving underwater object;
  receiving pulse echoes, wherein the pulse echoes collectively define a bottom return;
  detecting highly-sloped ocean-bottom terrain; and
  changing a parameter related to the transmitting of pulses.

4. The SONAR processing method of claim 3 wherein the parameter is the time between pulses.

5. The SONAR processing method of claim 3 wherein the parameter is the carrier frequency of transmit pulses, and wherein some transmitted pulses have different carrier frequencies than other transmitted pulses.

6. The SONAR processing method of claim 3 wherein the parameter is the phase of transmit pulses, and wherein some transmitted pulses have different phase than other transmitted pulses.

7. A SONAR processing method comprising:
  (a) transmitting pulses toward an ocean bottom from a moving underwater object;
  (b) receiving pulse echoes, wherein the pulse echoes collectively define a bottom return;
  (c) filtering data from the bottom return to generate a filtered echo envelope;
  (d) measuring signal plus noise from the filtered echo envelope;
  (e) estimating noise;
  (f) calculating a required signal-to-noise ratio using a SONAR range equation;
  (g) calculating a measured signal-to-noise ratio using results from operations (d) and (e); and
  (h) increasing at least one of a transmit power level or a pulse width when the measured signal-to-noise ratio is less than the required signal-to-noise ratio.

8. A SONAR processing method comprising:
  transmitting pulses toward an ocean bottom from a moving underwater object;
  receiving pulse echoes, wherein the pulse echoes collectively define a bottom return;
  filtering data from the bottom return to generate a filtered echo envelope;
  obtaining a first derivative of the filtered echo envelope at each of a plurality of locations;
  restricting selection of pulse echoes for velocity calculation from a first region of the bottom return that corresponds to a region of the filtered echo envelope that has near-zero first derivatives; and
  estimating the velocity of the underwater object using pulse echoes from the first region of the bottom return.

9. A SONAR processing method comprising:
  transmitting pulses toward an ocean bottom from a moving underwater object;
  receiving pulse echoes, wherein the pulse echoes collectively define a bottom return;
  storing a pulse location data sample number for which a first sufficient bi-pulse correlation occurs;
  measuring and storing the mean amplitude of the following X data samples, where X is proportional to a depth of the ocean bottom and composite transmit and receiver beam pattern;
  advance Y data samples, wherein Y is about X/10;
  continue bi-pulse amplitude correlation until one of the following conditions occur:

(a) a second sufficient bi-pulse amplitude correlation occurs, wherein if condition (a) occurs, then a mean amplitude of the following X data samples are measured; or (b) a predefined search window ends;

continue processing until the end of pulse location search window;

designating, as initial pulse location, the data sample number for which sufficient bi-pulse amplitude correlation and maximum amplitude is measured in the following X data samples;

form pulse-pairs based on the initial pulse location; and estimate velocity of the underwater object.

10. A SONAR processing method comprising:

transmitting pulses toward an ocean bottom from a moving underwater object;

receiving pulse echoes, wherein the pulse echoes collectively define a bottom return;

determining if the bottom return is an extreme specular return; and increasing at least one of the transmit power level or pulse width by measuring signal plus noise power for a number of pulse echoes for a region greater than a 3 dB transmit beam point width value when the bottom return is an extreme specular return.

* * * * *